United States Patent
Sasaki et al.

(10) Patent No.: US 11,652,235 B2
(45) Date of Patent: *May 16, 2023

(54) BATTERY

(71) Applicant: Panasonic Intellectual Property Management Co., Ltd., Osaka (JP)

(72) Inventors: Izuru Sasaki, Kyoto (JP); Akihiro Sakai, Nara (JP); Yuta Sugimoto, Hyogo (JP); Akinobu Miyazaki, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 365 days.

This patent is subject to a terminal disclaimer.

(21) Appl. No.: 16/931,072

(22) Filed: Jul. 16, 2020

(65) Prior Publication Data

US 2020/0350624 A1    Nov. 5, 2020

Related U.S. Application Data

(63) Continuation of application No. PCT/JP2018/042060, filed on Nov. 14, 2018.

(30) Foreign Application Priority Data

Jan. 26, 2018  (JP) .............................. JP2018-011523

(51) Int. Cl.
  *H01M 10/0562* (2010.01)
  *H01M 4/505* (2010.01)
  (Continued)

(52) U.S. Cl.
  CPC ...... *H01M 10/0562* (2013.01); *C01G 25/006* (2013.01); *H01M 4/131* (2013.01);
  (Continued)

(58) Field of Classification Search
  None
  See application file for complete search history.

(56) References Cited

U.S. PATENT DOCUMENTS 4,352,869 A    10/1982  Mellors
5,506,073 A     4/1996  Angell et al.
(Continued)

FOREIGN PATENT DOCUMENTS

CN    105254184 A    1/2016
CN    105680048 A    6/2016
(Continued)

OTHER PUBLICATIONS

Tomita, Yasumasa et al. "Substitution effect in the ion conductor Li3InBr6, studied by nuclear magnetic resonance." Zeitschriftfur Naturforschung A 57.6-7 (2002): 447-450 (Year: 2002).
(Continued)

*Primary Examiner* — Laura Weiner
(74) *Attorney, Agent, or Firm* — McDermott Will & Emery LLP (57) ABSTRACT

Provided is a battery comprising a cathode, an anode, and an electrolyte layer. The electrolyte layer includes a first electrolyte layer and a second electrolyte layer. The first electrolyte layer includes a first solid electrolyte material. The second electrolyte layer includes a second solid electrolyte material which is different from the first solid electrolyte material. The first solid electrolyte material includes lithium, at least one kind selected from the group consisting of metalloid elements and metal elements other than lithium, and at least one kind selected from the group consisting of chlorine and bromine. The first solid electrolyte material does not include sulfur.

6 Claims, 1 Drawing Sheet

(51) Int. Cl.
*H01M 4/525* (2010.01)
*H01M 10/0525* (2010.01)
*C01G 25/00* (2006.01)
*H01M 4/62* (2006.01)
*H01M 4/131* (2010.01)

(52) U.S. Cl.
CPC ........... *H01M 4/505* (2013.01); *H01M 4/525* (2013.01); *H01M 4/62* (2013.01); *H01M 10/0525* (2013.01); *H01M 2300/008* (2013.01); *H01M 2300/0094* (2013.01)

(56) References Cited

U.S. PATENT DOCUMENTS

| | | | |
|---|---|---|---|
| 5,714,279 | A | 2/1998 | Zajac, Jr. et al. |
| 6,428,935 | B1 | 8/2002 | Takada et al. |
| 9,160,034 | B2 | 10/2015 | Kato et al. |
| 10,008,735 | B2 | 6/2018 | Ohtomo et al. |
| 2004/0151986 | A1 | 8/2004 | Park et al. |
| 2011/0045355 | A1 | 2/2011 | Ichikawa |
| 2011/0300444 | A1 | 12/2011 | Nakamura |
| 2012/0301796 | A1 | 11/2012 | Ohtomo et al. |
| 2012/0308900 | A1 | 12/2012 | Ogasa |
| 2013/0295464 | A1 | 11/2013 | Yanagi et al. |
| 2015/0147659 | A1 | 5/2015 | Kato |
| 2016/0103232 | A1 | 4/2016 | Ouspenski et al. |
| 2016/0149259 | A1 | 5/2016 | Osada et al. |
| 2016/0156064 | A1 | 6/2016 | Miyashita et al. |
| 2016/0204467 | A1 | 7/2016 | Nogami et al. |
| 2016/0248119 | A1 | 8/2016 | Kato |
| 2016/0268630 | A1 | 9/2016 | Tsukada et al. |
| 2016/0285078 | A1 | 9/2016 | Deschamps et al. |
| 2016/0308210 | A1 | 10/2016 | Sakuda et al. |
| 2016/0359192 | A1 | 12/2016 | Homma et al. |
| 2016/0359193 | A1 | 12/2016 | Yi et al. |
| 2017/0040637 | A1 | 2/2017 | Ceder et al. |
| 2017/0179481 | A1 | 6/2017 | Yamada et al. |
| 2017/0187066 | A1 | 6/2017 | Tsujimura et al. |
| 2017/0222257 | A1 | 8/2017 | Miyashita et al. |
| 2017/0229734 | A1 | 8/2017 | Furukawa et al. |
| 2017/0288281 | A1 | 10/2017 | Chiang et al. |
| 2017/0309964 | A1 | 10/2017 | Iwamoto |
| 2018/0076452 | A1 | 3/2018 | Sasaki et al. |
| 2018/0183065 | A1 | 6/2018 | Sasaki |
| 2018/0269521 | A1 | 9/2018 | Ohtomo et al. |
| 2019/0067736 | A1 | 2/2019 | Yoshioka et al. |
| 2019/0088995 | A1 | 3/2019 | Asano et al. |
| 2019/0097266 | A1 | 3/2019 | Yamamoto et al. |
| 2020/0212481 | A1 | 7/2020 | Nagamine et al. |
| 2020/0328454 | A1 | 10/2020 | Sakai et al. |
| 2020/0328455 | A1 | 10/2020 | Sakai et al. |
| 2020/0328457 | A1 | 10/2020 | Sakai et al. |
| 2020/0328460 | A1 | 10/2020 | Asano et al. |
| 2020/0328461 | A1 | 10/2020 | Asano et al. |
| 2020/0328462 | A1 | 10/2020 | Asano et al. |
| 2020/0328464 | A1 | 10/2020 | Asano et al. |
| 2020/0328465 | A1 | 10/2020 | Sakaida et al. |
| 2020/0328468 | A1 | 10/2020 | Sakaida et al. |
| 2020/0328469 | A1 | 10/2020 | Asano et al. |
| 2020/0335817 | A1 | 10/2020 | Asano et al. |
| 2020/0350561 | A1 | 11/2020 | Kamitake et al. |
| 2020/0350615 | A1 | 11/2020 | Sakaida et al. |
| 2020/0350621 | A1 | 11/2020 | Sugimoto et al. |
| 2020/0350622 | A1 | 11/2020 | Sakaida et al. |
| 2021/0151791 | A1 | 5/2021 | Oshima et al. |
| 2021/0151792 | A1 | 5/2021 | Oshima et al. |

FOREIGN PATENT DOCUMENTS

| | | | |
|---|---|---|---|
| CN | 108701860 | A | 10/2018 |
| EP | 2916381 | B1 | 6/2016 |
| EP | 3043411 | A1 | 7/2016 |
| EP | 3428929 | A1 | 1/2019 |
| EP | 3496202 | A1 | 6/2019 |
| EP | 3736827 | A1 | 11/2020 |
| EP | 3736829 | A1 | 11/2020 |
| EP | 3736831 | A1 | 11/2020 |
| EP | 3736834 | A1 | 11/2020 |
| EP | 3736899 | A1 | 11/2020 |
| EP | 3745422 | A1 | 12/2020 |
| EP | 3745518 | A1 | 12/2020 |
| EP | 3863028 | A1 | 8/2021 |
| IN | 201847045950 | A | 2/2019 |
| JP | S57-132677 | A | 8/1982 |
| JP | H05-306117 | A | 11/1993 |
| JP | H08-171938 | A | 7/1996 |
| JP | H09-293516 | A | 11/1997 |
| JP | H11-238528 | A | 8/1999 |
| JP | 2001-052733 | A | 2/2001 |
| JP | 2004-235155 | A | 8/2004 |
| JP | 2006-244734 | | 9/2006 |
| JP | 2006-244734 | A | 9/2006 |
| JP | 2008-021556 | A | 1/2008 |
| JP | 2008-060033 | | 3/2008 |
| JP | 2008-234988 | | 10/2008 |
| JP | 2011-129312 | | 6/2011 |
| JP | 2011-253762 | | 12/2011 |
| JP | 5076134 | B2 | 11/2012 |
| JP | 2012-246196 | A | 12/2012 |
| JP | 2013-073791 | A | 4/2013 |
| JP | 2015-011901 | A | 1/2015 |
| JP | 2015-032529 | A | 2/2015 |
| JP | 2015-056349 | A | 3/2015 |
| JP | 2016-024874 | A | 2/2016 |
| JP | 2016-171067 | A | 9/2016 |
| JP | 2017-059342 | A | 3/2017 |
| JP | 2017-091953 | A | 5/2017 |
| JP | 2017-091955 | A | 5/2017 |
| JP | 2017-111954 | | 6/2017 |
| JP | 2017-117753 | A | 6/2017 |
| JP | 2017-518622 | A | 7/2017 |
| JP | 2017-152324 | A | 8/2017 |
| JP | 2017-199668 | | 11/2017 |
| JP | 6222134 | B2 | 11/2017 |
| JP | 2017-224474 | A | 12/2017 |
| WO | 2000/028608 | | 5/2000 |
| WO | 2011/073798 | A2 | 6/2011 |
| WO | 2015/011937 | A1 | 1/2015 |
| WO | 2015/030052 | A1 | 3/2015 |
| WO | 2015/049986 | A1 | 4/2015 |
| WO | 2015/136623 | | 9/2015 |
| WO | 2017/047015 | | 3/2017 |
| WO | 2017/108105 | A1 | 6/2017 |
| WO | 2017/154766 | A1 | 9/2017 |
| WO | 2017/154922 | A1 | 9/2017 |
| WO | 2018/025582 | A1 | 2/2018 |

OTHER PUBLICATIONS

Tomita, Yasumasa et al. "Synthesis of Li3+xIn1-xMxBr6 (M=Zn, Co, Fe) by Nano-grinding and their Ionic Conductivity." Transactions of the Materials Research Society of Japan 33.4 (2008): 973-976 (Year: 2008).
G. J. Kipouros et al. Reversible Electrode Potentials for Formation of Solid and Liquid Chlorozirconate and Chlorohafnate Compounds (Year: 1992).
Indian Examination Report dated Jun. 21, 2022 for the related Indian Patent Application No. 202047027487.
William D. Richards et al., "Interface Stability in Solid-State Batteries", Chemistry of Materials, 2016, vol. 28, Dec. 7, 2015, pp. 266-273.
Fudong Han et al. "A Battery Made from a Single Material", Advanced Materials, 27 (2015), pp. 3473-3483.
International Search Report of International Application No. PCT/JP2018/045584 dated Mar. 19, 2019.
International Search Report of International Application No. PCT/JP2018/043363 dated Feb. 19, 2019.
International Search Report of International Application No. PCT/JP2018/041893 dated Feb. 19, 2019.
International Search Report of International Application No. PCT/JP2018/041892 dated Feb. 19, 2019.

(56) References Cited

OTHER PUBLICATIONS

International Search Report of International Application No. PCT/JP2018/041894 dated Feb. 19, 2019.
International Search Report of International Application No. PCT/JP2018/046258 dated Feb. 5, 2019.
International Search Report of International Application No. PCT/JP2018/046259 dated Mar. 12, 2019.
International Search Report of International Application No. PCT/JP2018/046260 dated Mar. 12, 2019.
International Search Report of International Application No. PCT/JP2018/046262 dated Mar. 19, 2019.
International Search Report of International Application No. PCT/JP2018/041900 dated Feb. 19, 2019.
International Search Report of International Application No. PCT/JP2018/041897 dated Feb. 19, 2019.
International Search Report of International Application No. PCT/JP2018/046263 dated Mar. 19, 2019.
International Search Report of International Application No. PCT/JP2018/042061 dated Feb. 19, 2019.
International Search Report of International Application No. PCT/JP2018/042062 dated Feb. 19, 2019.
Yasumasa Tomita et al., "Lithium ion conductivity of Li3InBr6 doped with different element", Denka Chemical Society 70th Anniversary Conference Abstracts, Mar. 25, 2003, p. 384; with English translation.
Yasumasa Tomita et al., "Preparation of Substituted Compounds of Lithium Indium Bromide and Fabrication of All Solid-State battery", Recent Innovations in Chemical Engineering, 2017, 10, 12-17.
The Extended European Search Report dated Jan. 29, 2021 for the related European Patent Application No. 18898666.5.
The Extended European Search Report dated Feb. 5, 2021 for the related European Patent Application No. 18898795.2.
The Extended European Search Report dated Feb. 9, 2021 for the related European Patent Application No. 18898242.5.
The Extended European Search Report dated Feb. 9, 2021 for the related European Patent Application No. 18898043.7.
The Extended European Search Report dated Feb. 9, 2021 for the related European Patent Application No. 18898663.2.
The Extended European Search Report dated Feb. 9, 2021 for the related European Patent Application No. 18898873.7.
The Extended European Search Report dated Feb. 9, 2021 for the related European Patent Application No. 18898935.4.
The Extended European Search Report dated Feb. 9, 2021 for the related European Patent Application No. 18902720.4.
The Extended European Search Report dated Feb. 9, 2021 for the related European Patent Application No. 18898525.3.
The Extended European Search Report dated Feb. 10, 2021 for the related European Patent Application No. 18898462.9.
The Extended European Search Report dated Feb. 15, 2021 for the related European Patent Application No. 18898524.6.
Lutz H D et al: "Ionic motion of tetrahedrally and octahedrally coordinated lithium ions in ternary and quaternary halides", Solid State Ionics, North Holland Pub. Company. Amsterdam; NL, NL, vol. 28-30, Sep. 1, 1988?(Sep. 1, 1988), pp. 1282-1286, XP024682689.
Tetsuya Asano; Akihiro Sakai; Satoru Ouchi; Masashi Sakaida; Akinobu Miyazaki; Shinya Hasegawa: "Solid Halide Electrolytes with High Lithium-Ion Conductivity for Application in 4 V Class Bulk-Type All-Solid-State Batteries", Advanced Materials, vol. 30, No. 44, Sep. 14, 2018?(Sep. 14, 2018), p. 1803075, XP055721991.
International Search Report of International Application No. PCT/JP2018/046264 dated Mar. 19, 2019.
International Search Report of International Application No. PCT/JP2018/045588 dated Mar. 19, 2019.
International Search Report of International Application No. PCT/JP2018/042060 dated Jan. 29, 2019.
International Search Report of International Application No. PCT/JP2019/040062 dated Dec. 24, 2019.
International Search Report of International Application No. PCT/JP2019/040063 dated Dec. 24, 2019.
Andreas Bohnsack et al., "The Bromides Li3MBr6 (M=Sm—Lu, Y): Synthesis, Crystal Structure, and Ionic Mobility", Journal of Inorganic and General Chemistry, Sep. 1997, vol. 623/Issue 9, pp. 1352-1356.
Andreas Bohnsack et al., "Ternary Chlorides of the Rare-Earth Elements with Lithium, Li3MCl6 (M=Tb–Lu, Y, Sc): Synthesis, Crystal Structures, and Ionic Motion", Journal of Inorganic and General Chemistry, Jul. 1997, vol. 623/Issue 7, pp. 1067-1073.
The Extended European Search Report dated Feb. 11, 2021 for the related European Patent Application No. 18902871.5.
The Extended European Search Report dated Feb. 10, 2021 for the related European Patent Application No. 18902731.1.
The Extended European Search Report dated Feb. 17, 2021 for the related European Patent Application No. 18902279.1.
The Extended European Search Report dated Dec. 20, 2021 for the related European Patent Application No. 19891097.8.
English Translation of Chinese Search Report dated Jul. 6, 2021 for the related Chinese Patent Application No. 201880071236.0.
English Translation of Chinese Search Report dated Jul. 30, 2021 for the related Chinese Patent Application No. 201880071076.X.
English Translation of Chinese Search Report dated Aug. 2, 2021 for the related Chinese Patent Application No. 201880070620.9.
Indian Examination Report dated Apr. 4, 2022 for the related Indian Patent Application No. 202047027797.
Indian Examination Report dated Apr. 4, 2022 for the related Indian Patent Application No. 202047027476.
Indian Examination Report dated Apr. 29, 2022 for the related Indian Patent Application No. 202047027475.
Indian Examination Report dated May 25, 2022 for the related Indian Patent Application No. 202047027723.
Indian Examination Report dated Jun. 13, 2022 for the related Indian Patent Application No. 202047027726.
Indian Examination Report dated Jun. 14, 2022 for the related Indian Patent Application No. 202047027488.
Tomita, Y. et al., "Substitution effect of ionic conductivity in lithium ion conductor, Li3InBr6-xClx.," Solid State Ionics 179.21-26 (2008): 867-870. (Year: 2008).
Steiner, H-J., and H. D. Lutz, "Neue schnelle Ionenleiter vom Typ MI3 MIIICl6 (MI=Li, Na, Ag; MIII=In, Y)." Zeitschrift fur anorganische und allgemeine Chemie 613.7 (1992): 26-30 (Year: 1992).
International Search Report of PCT application No. PCT/JP2018/042060 dated Jan. 29, 2019.

BATTERY

BACKGROUND

1. Technical Field

The present disclosure relates to a battery.

2. Description of the Related Art

Patent Literature 1 discloses an all-solid battery using, as a solid electrolyte, a halide including indium.

Non-patent Literature 1 discloses a calculation result regarding electric potential stability of a solid electrolyte including a halogen element as a constituent element.

CITATION LIST

Patent Literature

Patent Literature 1: Japanese Patent Application Publication No. 2006-244734

Non-Patent Literature

Non-patent Literature 1: Chem. Mater. 2016, 28, 266-273.

SUMMARY

In the prior art, further improvement in charge/discharge efficiency of a battery is desired.

The battery according to one aspect of the present disclosure comprises:

a cathode;

an anode; and an electrolyte layer disposed between the cathode and the anode, wherein the electrolyte layer includes a first electrolyte layer and a second electrolyte layer;

the first electrolyte layer is disposed between the cathode and the second electrolyte layer;

the first electrolyte layer includes a first solid electrolyte material;

the second electrolyte layer includes a second solid electrolyte material which is a material different from the first solid electrolyte material;

the first solid electrolyte material includes:

lithium;

at least one kind selected from the group consisting of metalloid elements and metal elements other than lithium; and at least one kind selected from the group consisting of chlorine and bromine; and the first solid electrolyte material does not include sulfur.

According to the present disclosure, the charge/discharge efficiency of the battery can be improved.

DETAILED DESCRIPTION OF THE EMBODIMENT

Hereinafter, an embodiment of the present disclosure will be described with reference to the drawing.

First Embodiment

Figure 1:
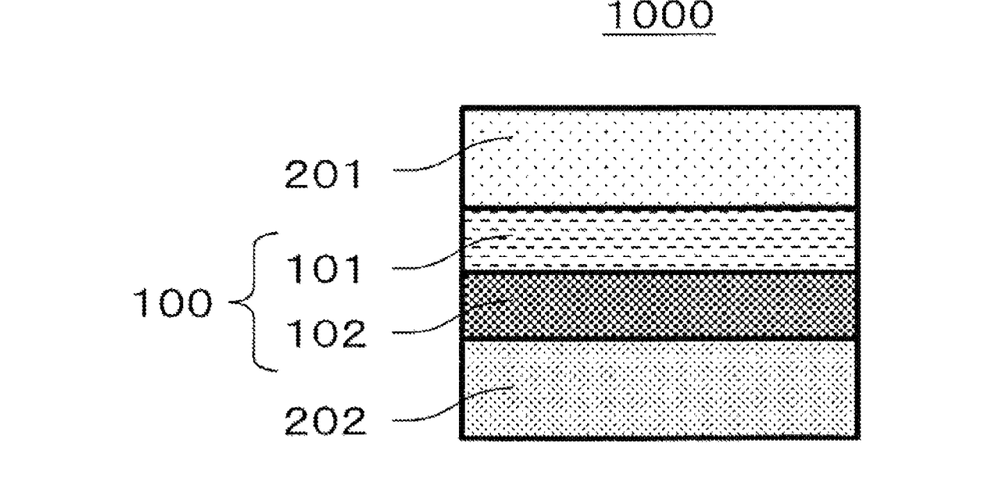
FIG. 1 is a cross-sectional view showing a schematic configuration of a battery 1000 in a first embodiment.

FIG. 1 is a cross-sectional view showing a schematic configuration of a battery 1000 in the first embodiment.

The battery 1000 in the first embodiment comprises a cathode 201, an anode 202, and an electrolyte layer 100.

The electrolyte layer 100 is provided between the cathode 201 and the anode 202.

The electrolyte layer 100 includes a first electrolyte layer 101 and a second electrolyte layer 102.

The first electrolyte layer 101 is provided between the cathode 201 and the second electrolyte layer 102.

The first electrolyte layer 101 includes a first solid electrolyte material.

The second electrolyte layer 102 includes a second solid electrolyte material. The second solid electrolyte material is a material different from the first solid electrolyte material.

The first solid electrolyte material is a material represented by the following composition formula (1):

$$Li_\alpha M_\beta X_\gamma \quad \text{Formula (1)}$$

where, $\alpha$, $\beta$ and $\gamma$ are values larger than 0.

M includes at least one of metalloid elements and metal elements other than Li.

X includes at least one of Cl and Br.

According to the above configuration, a charge/discharge efficiency of the battery can be improved.

A halide solid electrolyte has high ion conductivity and excellent thermal stability. The halide solid electrolyte does not generate a harmful gas such as hydrogen sulfide. By using the halide solid electrolyte for both the first electrolyte layer 101 and the second electrolyte layer 102, an output characteristic and the thermal stability of the battery can be improved, and the generation of the harmful gas such as hydrogen sulfide can be suppressed.

In addition, a halide solid electrolyte including at least one of metalloid elements and metal elements other than Li has higher ion conductivity than a halide solid electrolyte such as LiI composed only of Li and a halogen element. Therefore, if the halide solid electrolyte including the at least one of the metalloid elements and the metal elements other than Li is used for the battery, the output characteristic of the battery can be improved.

The term "metalloid elements" are B, Si, Ge, As, Sb, and Te.

The term "metal elements" are all elements included in Groups 1 to 12 of the periodic table except for hydrogen, and all the elements included in Groups 13 to 16 of the periodic table except for the above-mentioned metalloid elements, C, N, P, O, S, and Se. In other words, the metal element becomes a cation, if the metal element forms an inorganic compound with a halogen compound.

In the composition formula (1), M may include Y (=yttrium).

In other words, the first solid electrolyte material may include Y as a metal element.

According to the above configuration, the ion conductivity of the first solid electrolyte material can be further improved. Thereby, the charge/discharge efficiency of the battery can be further improved.

The first solid electrolyte material including Y may be, for example, a compound represented by a composition formula $Li_aMe_bY_cX_6$ (a+mb+3c=6 and c>0 are satisfied) (Me: at least one of metalloid elements and metal elements other than Li and Y) (m: valence of Me).

As Me, any of Mg, Ca, Sr, Ba, Zn, Sc, Al, Ga, Bi, Zr, Hf, Ti, Sn, Ta, Nb, or a mixture thereof may be used.

According to the above configuration, the ion conductivity of the first solid electrolyte material can be further improved.

In the composition formula (1), $2 \leq \gamma/\alpha \leq 2.4$ may be satisfied.

In the composition formula (1), $2.5 \leq \alpha \leq 3$;

$1 \leq \beta \leq 1.1$; and $\gamma = 6$ may be satisfied.

According to the above configuration, the ion conductivity of the first solid electrolyte material can be further improved. Thereby, the charge/discharge efficiency of the battery can be further improved.

The first solid electrolyte material may be a material represented by the following composition formula (A1):

$$Li_{6-3d}Y_dX_6 \qquad \text{Formula (A1)}$$

where, in the composition formula (A1), X is at least one of Cl and Br.

In addition, in the composition formula (A1), $0<d<2$ is satisfied.

According to the above configuration, the ion conductivity of the first solid electrolyte material can be further improved. Thereby, the charge/discharge efficiency of the battery can be further improved.

The first solid electrolyte material may be a material represented by the following composition formula (A2):

$$Li_3YX_6 \qquad \text{Formula (A2)}$$

where, in the composition formula (A2), X is at least one of Cl and Br.

According to the above configuration, the ion conductivity of the first solid electrolyte material can be further improved. Thereby, the charge/discharge efficiency of the battery can be further improved.

The first solid electrolyte material may be a material represented by the following composition formula (A3):

$$Li_{3-3\delta}Y_{1+\delta}Cl_6 \qquad \text{Formula (A3)}$$

where, in the composition formula (A3), $0<\delta\leq0.15$ is satisfied.

According to the above configuration, the ion conductivity of the first solid electrolyte material can be further improved. Thereby, the charge/discharge efficiency of the battery can be further improved.

The first solid electrolyte material may be a material represented by the following composition formula (A4):

$$Li_{3-3\delta}Y_{1+\delta}Br_6 \qquad \text{Formula (A4)}$$

where, in the composition formula (A4), $0<\delta\leq0.25$ is satisfied.

According to the above configuration, the ion conductivity of the first solid electrolyte material can be further improved. Thereby, the charge/discharge efficiency of the battery can be further improved.

The first solid electrolyte material may be a material represented by the following composition formula (A5):

$$Li_{3-3\delta+a}Y_{1+\delta-a}Me_aCl_{6-x}Br_x \qquad \text{Formula (A5)}$$

where, in the composition formula (A5), Me is one or more kinds of elements selected from the group consisting of Mg, Ca, Sr, Ba, and Zn.

In addition, in the composition formula (A5), $-1<\delta<2$;

$0<a<3$;

$0<(3-3\delta+a)$;

$0<(1+\delta-a)$; and $0 \leq x \leq 6$ are satisfied.

According to the above configuration, the ion conductivity of the first solid electrolyte material can be further improved. Thereby, the charge/discharge efficiency of the battery can be further improved.

The first solid electrolyte material may be a material represented by the following composition formula (A6):

$$Li_{3-3\delta}Y_{1+\delta-a}Me_aCl_{6-x}Br_x \qquad \text{Formula (A6)}$$

where, in the composition formula (A6), Me is one or more kinds of elements selected from the group consisting of Al, Sc, Ga, and Bi.

In addition, in the composition formula (A6), $-1<\delta<1$;

$0<a<2$;

$0<(1+\delta-a)$; and $0 \leq x \leq 6$ are satisfied.

According to the above configuration, the ion conductivity of the first solid electrolyte material can be further improved. Thereby, the charge/discharge efficiency of the battery can be further improved.

The first solid electrolyte material may be a material represented by the following composition formula (A7):

$$Li_{3-3\delta-a}Y_{1+\delta-a}Me_aCl_{6-x}Br_x \qquad \text{Formula (A7)}$$

where, in the composition formula (A7), Me is one or more kinds of elements selected from the group consisting of Zr, Hf, and Ti.

In addition, in the composition formula (A7), $-1<\delta<1$;

$0<a<1.5$;

$0<(3-3\delta-a)$;

$0<(1+\delta-a)$; and $0 \leq x \leq 6$ are satisfied.

According to the above configuration, the ion conductivity of the first solid electrolyte material can be further improved. Thereby, the charge/discharge efficiency of the battery can be further improved.

The first solid electrolyte material may be a material represented by the following composition formula (A8):

$$Li_{3-3\delta-2a}Y_{1+\delta-a}Me_aCl_{6-x}Br_x \qquad \text{Formula (A8)}$$

where, in the composition formula (A8), Me is one or more kinds of elements selected from the group consisting of Ta and Nb.

In the composition formula (A8), $-1 < \delta < 1;$ $0 < a < 1.2;$ $0 < (3 - 3\delta - 2a);$ $0 < (1 + \delta - a);$ and $0 \le x \le 6$ are satisfied.

According to the above configuration, the ion conductivity of the first solid electrolyte material can be further improved. Thereby, the charge/discharge efficiency of the battery can be further improved.

As the first solid electrolyte material, for example, $Li_3YX_6$, $Li_2MgX_4$, $Li_2FeX_4$, $Li(Al, Ga, In)X_4$, or $Li_3(Al, Ga, In)X_6$ (X: Cl, Br) may be used.

The second solid electrolyte material is a material represented by the following composition formula (2):

Formula (2)

where $\alpha'$, $\beta'$, and $\gamma'$ are values greater than zero;

M' includes at least one of metalloid elements and metal elements other than Li; and X' includes I and at least one of Cl and Br.

According to the above configuration, the charge/discharge efficiency of the battery can be further improved.

Patent Literature 1 discloses that, in the all-solid secondary battery including a solid electrolyte consisting of a compound including indium, it is preferable that the cathode active material has an electric potential with regard to Li of not more than 3.9 V on average, and that thereby a film consisting of a decomposition product due to oxidative decomposition of a solid electrolyte is well formed to provide a good charge/discharge characteristic. In addition, a general layered transition metal oxide cathode such as $LiCoO_2$ or $LiNi_{0.8}Co_{0.15}Al_{0.05}O_2$ is disclosed as a cathode active material having an electric potential with regard to Li of not more than 3.9 V on average.

On the other hand, as a result of intensive studies by the present inventors, in a battery in which the halide solid electrolyte including I (namely, the second solid electrolyte material) is used for the cathode material, even if the cathode active material having an electric potential with regard to Li of not more than 3.9 V on average is used, there is a problem that the halide solid electrolyte is oxidized and decomposed during charge to decrease the charge/discharge efficiency of the battery. The present inventors found that the reason therefor is oxidation reaction of I included in the halide solid electrolyte. Specifically, it is conceivable that, in addition to the normal charging reaction in which lithium and electrons are extracted from the cathode active material in the cathode material, a side reaction in which electrons are also extracted from the halide solid electrolyte including I in contact with the cathode active material occurs. As a result, charges would be consumed for the side reaction to decrease the charge/discharge efficiency. In addition, as a result of the oxidation reaction of the halide solid electrolyte including I, an oxidative decomposition layer having poor lithium-ion conductivity is formed between the cathode active material and the halide solid electrolyte, and the oxidative decomposition layer functions as a large interface resistance in the electrode reaction of the cathode. In order to solve this problem, it is necessary to suppress electron transfer to the halide solid electrolyte including I to suppress the formation of the oxidative decomposition layer.

Non-patent Literature 1 discloses calculation results regarding electric potential stability of various solid electrolytes such as an oxide solid electrolyte, a sulfide solid electrolyte, and a halide solid electrolyte. With regard to the halide solid electrolyte, it has been disclosed that the electric potential stability thereof varies depending on the anion species forming the halide solid electrolyte. For example, it has been disclosed that a halide solid electrolyte including Br has an electric potential stability of not more than 4.0 V vs. Li.

On the other hand, as a result of intensive studies by the present inventors, the present inventors found that, even if solid electrolytes have an upper limit of the electric potential stability derived from calculation of less than 4.0 V vs. Li, some of the solid electrolytes exhibit the stable charge/discharge characteristic, if used for a cathode material. For example, the present inventors found that, if a halide solid electrolyte which includes Br and has an upper limit of the electric potential stability of not more than 4.0 V vs. Li is used for the cathode material, the halide solid electrolyte exhibits the good charge/discharge characteristic, even if the halide solid electrolyte is charged at a voltage of not less than 4.0 V vs. Li. On the other hand, the present inventors found that, if a halide solid electrolyte including I is used for the cathode material, charge/discharge efficiency is lowered significantly. Although details of the mechanism thereof are not clear, if the halide solid electrolyte including Br is used for the cathode material, the solid electrolyte is oxidized during charging in the immediate vicinity where the cathode active material and the solid electrolyte are in contact with each other. However, since the electronic conductivity of the oxidation product is significantly low, the reaction would not proceed continuously into the solid electrolyte. On the other hand, if the halide solid electrolyte including I is used for the cathode material, the oxidation product of the solid electrolyte has electronic conductivity. As a result, the reaction would not be retained only in the vicinity where the cathode active material and the solid electrolyte are in contact with each other, the reaction would proceed continuously into the solid electrolyte, and a large amount of stored charge would be consumed for the oxidation reaction of the solid electrolyte. As a result, the charge/discharge efficiency of the battery would be lowered. As described above, the battery operation when the solid electrolyte is used for the cathode material cannot be estimated only from the calculation results disclosed in Non-patent Literature 1.

Since the halide solid electrolyte including I has poor oxidation stability, in the battery in which the cathode 201 and the halide solid electrolyte including I are in contact with each other, oxidative decomposition occurs continuously during the charging.

On the other hand, the halide solid electrolyte which does not include I (namely, the first solid electrolyte material) is excellent in oxidation stability. Further, in the battery in which the cathode 201 and the halide solid electrolyte which does not include I are in contact with each other, the oxidative decomposition does not occur. In case where the oxidative decomposition occurs, the reaction of the oxidative decomposition does not continue.

In addition, the halide solid electrolyte including I is more excellent in ion conductivity than the halide solid electrolyte which does not include I. Therefore, according to the above configuration, the output characteristic of the battery can be improved, as compared with a case where only the halide solid electrolyte which does not includes I is used for the electrolyte layer.

In the composition formula (2), M' may include Y (=yttrium).

In other words, the second solid electrolyte material may include Y as a metal element.

According to the above configuration, the ion conductivity of the second solid electrolyte material can be further improved. Thereby, the charge/discharge efficiency of the battery can be further improved.

The second solid electrolyte material including Y may be, for example, a compound represented by a composition formula $Li_aMe'_bY_cX'_6$ (a+mb+3c=6 and c>0 are satisfied) (Me': at least one of metalloid elements and metal elements other than Li and Y) (m: valence of Me').

As Me', any of Mg, Ca, Sr, Ba, Zn, Sc, Al, Ga, Bi, Zr, Hf, Ti, Sn, Ta, and Nb, or a mixture thereof may be used.

According to the above configuration, the ion conductivity of the second solid electrolyte material can be further improved.

In the composition formula (2), $2.7 \leq \alpha' \leq 3$;

$8' \leq \beta' \leq 1.1$; and $\gamma'=6$ may be satisfied.

According to the above configuration, the ionic conductivity of the second solid electrolyte material can be further improved. Thereby, the charge/discharge efficiency of the battery can be further improved.

The second solid electrolyte material may be a material represented by the following composition formula (B1):

$$Li_{6-3d}Y_dX_6 \quad \text{Formula (B1)}$$

where, in the composition formula (B1), X includes I and at least one of Cl and Br.

In the composition formula (B1), $0<d<2$ is satisfied.

According to the above configuration, the ion conductivity of the second solid electrolyte material can be further improved. Thereby, the charge/discharge efficiency of the battery can be further improved.

The second solid electrolyte material may be a material represented by the following composition formula (B2):

$$Li_3YX_6 \quad \text{Formula (B2)}$$

where, in the composition formula (B2), X includes I and at least one of Cl and Br.

According to the above configuration, the ion conductivity of the second solid electrolyte material can be further improved. Thereby, the charge/discharge efficiency of the battery can be further improved.

The second solid electrolyte material may be a material represented by the following composition formula (B3):

$$Li_{3-3\delta+a}Y_{1+\delta-a}Me_aCl_{6-x-y}Br_xI_y \quad \text{Formula (B3)}$$

where, in the composition formula (B3), Me is one or more kinds of elements selected from the group consisting of Mg, Ca, Sr, Ba, and Zn.

In the composition formula (B3), $-1<\delta<2$;

$0<a<3$;

$0<(3-3\delta+a)$;

$0<(1+\delta-a)$;

$0 \leq x<6$;

$0<y \leq 6$; and $(x+y)<6$ are satisfied.

According to the above configuration, the ion conductivity of the second solid electrolyte material can be further improved. Thereby, the charge/discharge efficiency of the battery can be further improved.

The second solid electrolyte material may be a material represented by the following composition formula (B4):

$$Li_{3-3\delta}Y_{1+\delta-a}Me_aCl_{6-x-y}Br_xI_y \quad \text{Formula (B4)}$$

where, in the compositional formula (B4), Me is one or more kinds of elements selected from the group consisting of Al, Sc, Ga, and Bi.

In the composition formula (B4), $-1<\delta<1$;

$0<a<2$;

$0<(1+\delta-a)$;

$0 \leq x<6$;

$0<y \leq 6$; and $(x+y)<6$ are satisfied.

According to the above configuration, the ion conductivity of the second solid electrolyte material can be further improved. Thereby, the charge/discharge efficiency of the battery can be further improved.

The second solid electrolyte material may be a material represented by the following composition formula (B5):

$$Li_{3-3\delta-a}Y_{1+\delta-a}Me_aCl_{6-x-y}Br_xI_y \quad \text{Formula (B5)}$$

where, in the composition formula (B5), Me is one or more kinds of elements selected from the group consisting of Zr, Hf, and Ti.

In the composition formula (B5), $-1<\delta<1$;

$0<a<1.5$;

$0<(3-3\delta-a)$;

$0<(1+\delta-a)$;

$0 \leq x<6$;

$0<y \leq 6$; and $(x+y)<6$ are satisfied.

According to the above configuration, the ion conductivity of the second solid electrolyte material can be further improved. Thereby, the charge/discharge efficiency of the battery can be further improved.

The second solid electrolyte material may be a material represented by the following composition formula (B6):

$$Li_{3-3\delta-2a}Y_{1+\delta-a}Me_aCl_{6-x-y}Br_xI_y \quad \text{Formula (B6)}$$

where, in the composition formula (B6), Me is one or more kinds of elements selected from the group consisting of Ta and Nb.

In the composition formula (B6), $-1<\delta<1$;

$0<a<1.2$;

$0<(3-3\delta-2a)$;

$0 < (1+\delta-a)$;

$0 \leq x < 6$;

$0 < y \leq 6$; and $(x+y) < 6$ are satisfied.

According to the above configuration, the ion conductivity of the second solid electrolyte material can be further improved. Thereby, the charge/discharge efficiency of the battery can be further improved.

As the second solid electrolyte material, for example, $Li_3YX_6$, $Li_2MgX_4$, $Li_2FeX_4$, $Li(Al, Ga, In)X_4$, or $Li_3(Al, Ga, In)X_6$ (X: includes I and at least one of Cl and Br) may be used.

The second electrolyte layer 102 may include the second solid electrolyte material as a main component. In other words, the second electrolyte layer 102 may include the second solid electrolyte material, for example, at a weight ratio of not less than 50% (not less than 50% by weight) with respect to the entire second electrolyte layer 102.

According to the above configuration, the charge/discharge characteristic of the battery can be further improved.

The second electrolyte layer 102 may include the second solid electrolyte material, for example, at a weight ratio of not less than 70% (not less than 70% by weight) with respect to the entire second electrolyte layer 102.

According to the above configuration, the charge/discharge characteristic of the battery can be further improved.

The second electrolyte layer 102 includes the second solid electrolyte material as the main component thereof, and the second electrolyte layer 102 may further include inevitable impurities. The second electrolyte layer 102 may include the starting materials used for the synthesis of the second solid electrolyte material. The second electrolyte layer 102 may include by-products or decomposition products generated when the second solid electrolyte material is synthesized.

In addition, the second electrolyte layer 102 may include the second solid electrolyte material, for example, at a weight ratio of 100% (100% by weight) with respect to the entire second electrolyte layer 102, except for the inevitable impurities.

According to the above configuration, the charge/discharge characteristic of the battery can be further improved.

The second electrolyte layer 102 may be comprised only from the second solid electrolyte material.

The second electrolyte layer 102 may be located without being in contact with the cathode 201.

In other words, in the configuration of the present disclosure, the cathode 201 and the second electrolyte layer 102 including a halide solid electrolyte including I do not have to be in direct contact with each other by being separated by the first electrolyte layer 101 including the halide solid electrolyte which does not include I.

According to the above configuration, the oxidation of the halide solid electrolyte including I can be suppressed, and the charge/discharge efficiency of the battery can be improved.

The cathode 201 includes a cathode active material and an electrolyte material.

The cathode active material includes a material having a property of occluding and releasing metal ions (for example, lithium ions). Examples of the cathode active material include a lithium-containing transition metal oxide (e.g., $Li(NiCoAl)O_2$, $Li(NiCoMn)O_2$, or $LiCoO_2$), a transition metal fluoride, a polyanion, a fluorinated polyanion material, a transition metal sulfide, a transition metal oxysulfide, or a transition metal oxynitride. In particular, if a lithium-containing transition metal oxide is used as the cathode active material, manufacturing cost can be lowered and an average discharge voltage can be increased.

In the first embodiment, the cathode active material may be a lithium nickel-cobalt-manganese oxide. For example, the cathode active material may be $Li(NiCoMn)O_2$. According to the above configuration, the energy density of the battery can be further increased.

The electrolyte material included in the cathode 201 is, for example, a solid electrolyte. As the solid electrolyte, for example, a sulfide solid electrolyte, an oxide solid electrolyte, a polymer solid electrolyte, a complex hydride solid electrolyte, or a halide solid electrolyte (for example, the first solid electrolyte material) may be used.

As the sulfide solid electrolyte, $Li_2S-P_2S_5$, $Li_2S-SiS_2$, $Li_2S-B_2S_3$, $Li_2S-GeS_2$, $Li_{3.25}Ge_{0.25}P_{0.75}S_4$, or $Li_{10}GeP_2S_{12}$ may be used. In addition, LiX (X: F, Cl, Br, I), $Li_2O$, $MO_q$, or $Li_pMO_q$ (M: any of P, Si, Ge, B, Al, Ga, In, Fe, and Zn) (p, q: natural number) may be added thereto.

As the oxide solid electrolyte, for example, a NASICON solid electrolyte such as $LiTi_2(PO_4)_3$ and its element substitution products, a $(LaLi)TiO_3$ perovskite solid electrolyte, a LISICON solid electrolyte such as $Li_{14}ZnGe_4O_{16}$, $Li_4SiO_4$, or $LiGeO_4$ and its element substitution products, a garnet solid electrolyte such as $Li_7La_3Zr_2O_{12}$ and its element substitution products, $Li_3N$ and its H substitution products, $Li_3PO_4$ and its N substitution products, glass to which $Li_2SO_4$ or $Li_2CO_3$ has been added using a Li—B—O compound such as $LiBO_2$ or $Li_3BO_3$ as the base thereof, or glass ceramics may be used.

As the polymer solid electrolyte, for example, a compound of a polymer compound and a lithium salt can be used. The polymer compound may have an ethylene oxide structure. Due to the ethylene oxide structure, a large amount of lithium salt can be included to further increase the ion conductivity. As a lithium salt, $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, or $LiC(SO_2CF_3)_3$ may be used. As a lithium salt, one lithium salt selected therefrom may be used alone. Alternatively, a mixture of two or more lithium salts selected therefrom may be used as the lithium salt.

As the complex hydride solid electrolyte, for example, $LiBH_4$—LiI or $LiBH_4$—$P_2S_5$ may be used.

The cathode 201 may include a first solid electrolyte material. In other words, the first solid electrolyte material may be used as the solid electrolyte included in the cathode 201.

If the first solid electrolyte material is used, since the oxidation stability is excellent, the charge/discharge efficiency of the battery can be further improved. In addition, the thermal stability of the battery can be improved and the generation of harmful gas such as hydrogen sulfide can be suppressed.

A shape of the electrolyte material included in the cathode 201 is not particularly limited, and may be, for example, a needle shape, a spherical shape, or an elliptical spherical shape. For example, the shape of the electrolyte material may be particles.

For example, if the shape of the electrolyte material in the first embodiment is particulate (for example, spherical), the median diameter thereof may be not more than 100 μm.

If the median diameter is more than 100 μm, there is a possibility that a good dispersion state of the cathode active material and the electrolyte material fails to be formed in the cathode 201. For this reason, the charge/discharge characteristic is lowered.

In the first embodiment, the median diameter of the electrolyte material may be not more than 10 µm.

According to the above configuration, in the cathode 201, a good dispersion state of the cathode active material and the electrolyte material can be formed.

In the first embodiment, the median diameter of the electrolyte material may be smaller than the median diameter of the cathode active material.

According to the above configuration, a better dispersion state of the electrolyte material and the cathode active material can be formed in the electrode.

The median diameter of the cathode active material may be not less than 0.1 µm and not more than 100 µm.

If the median diameter of the cathode active material is less than 0.1 µm, there is a possibility that a good dispersion state of the cathode active material and the electrolyte material fails to be formed in the cathode 201. As a result, the charge/discharge characteristic of the battery is lowered.

Further, if the median diameter of the cathode active material is more than 100 µm, lithium diffusion in the cathode active material is made slow. As a result, it may be difficult to operate the battery at high output.

The median diameter of the cathode active material may be larger than the median diameter of the electrolyte material. Thereby, a good dispersion state of the cathode active material and the electrolyte material can be formed.

With regard to a volume ratio "v:100−v" of the cathode active material and the electrolyte material included in the cathode 201, $30 \leq v \leq 95$ may be satisfied. If v<30, it may be difficult to secure an energy density of the battery sufficiently. In addition, if v>95, the operation at high output may be difficult.

The thickness of the cathode 201 may be not less than 10 µm and not more than 500 µm. In addition, if the thickness of the cathode 201 is less than 10 µm, it may be difficult to secure an energy density of the battery sufficiently. In addition, if the thickness of the cathode 201 is more than 500 µm, the operation at high output may be difficult.

The thickness of the first electrolyte layer 101 and the second electrolyte layer 102 may be not less than 1 µm and not more than 300 µm. If the thickness is less than 1 µm, the possibility that the cathode 201 and the anode 202 are short-circuited, and that the cathode 201 and the second electrolyte layer 102 are in direct contact with each other is increased. In addition, if the thickness is more than 300 µm, the operation at high output may be difficult.

The anode 202 includes a material having a property of occluding and releasing metal ions (for example, lithium ions). The anode 202 includes, for example, an anode active material.

As the anode active material, a metal material, a carbon material, an oxide, a nitride, a tin compound, or a silicon compound may be used. The metal material may be a single metal. Alternatively, the metal material may be an alloy. Examples of the metal material include a lithium metal and a lithium alloy. Examples of the carbon material include natural graphite, coke, graphitized carbon, carbon fiber, spherical carbon, artificial graphite, and amorphous carbon. From the viewpoint of capacity density, silicon (Si), tin (Sn), a silicon compound, or a tin compound may be preferably used.

The anode 202 may include an electrolyte material. According to the above configuration, the lithium ion conductivity inside the anode 202 is increased to allow the operation athigh output. The electrolyte material included in the anode 202 is, for example, a solid electrolyte. As the solid electrolyte material, materials exemplified as the cathode 201 may be used.

The median diameter of the anode active material particles may be not less than 0.1 µm and not more than 100 µm. If the median diameter of the anode active material particles is less than 0.1 µm, there is a possibility that a good dispersion state of the anode active material particles and the electrolyte material fails to be formed in the anode. Thereby, the charge/discharge characteristic of the battery is lowered. On the other hand, if the median diameter of the anode active material particles is more than 100 µm, the diffusion of lithium in the anode active material particles is made slow. As a result, it may be difficult to operate the battery at high output.

The median diameter of the anode active material particles may be larger than the median diameter of the electrolyte material. Thereby, the good dispersion state of the anode active material particles and the electrolyte material can be formed.

With regard to a volume ratio "v:100−v" of the anode active material particles and the electrolyte material included in the anode 202, 30 v 95 may be satisfied. If v<30, it may be difficult to secure an energy density of the battery sufficiently. In addition, if v>95, the operation at high output may be difficult.

The thickness of the anode 202 may be not less than 10 µm and not more than 500 µm. If the thickness of the anode is less than 10 µm, it may be difficult to secure an energy density of the battery sufficiently. In addition, if the thickness of the anode is more than 500 µm, the operation at high output may be difficult.

The cathode active material particles and the anode active material particles may be coated with a coating material for the purpose of lowering the interface resistance.

As the coating material, for example, a sulfide solid electrolyte, an oxide solid electrolyte, a halide solid electrolyte, a polymer solid electrolyte, or a complex hydride solid electrolyte may be used.

The coating material may be an oxide solid electrolyte.

The oxide solid electrolyte has high electric potential stability. For this reason, the charge/discharge efficiency can be further improved by using the oxide solid electrolyte.

Examples of the oxide solid electrolyte which may be used as the coating material include a Li—Nb—O compound such as $LiNbO_3$, a Li—B—O compound such as $LiBO_2$ or $Li_3BO_3$, a Li—Al—O compound such as $LiAlO_2$, a Li—Si—O compound such as $Li_4SiO_4$, $Li_2SO_4$, a Li—Ti—O compound such as $Li_4Ti_5O_{12}$, a Li—Zr—O compound such as $Li_2ZrO_3$, a Li—Mo—O compound such as $Li_2MoO_3$, a Li—V—O compound such as $LiV_2O_5$, and a Li—W—O compound such as $Li_2WO_4$.

At least one of the first electrolyte layer 101 and the second electrolyte layer 102 may include a sulfide solid electrolyte, an oxide solid electrolyte, a polymer solid electrolyte, or a complex hydride solid electrolyte for the purpose of facilitating the exchange of lithium ions and improving the output characteristic of the battery. As the sulfide solid electrolyte, the oxide solid electrolyte, the polymer solid electrolyte, and the complex hydride solid electrolyte, materials exemplified as the electrolyte material of the cathode 201 may be used.

At least one of the cathode 201, the first electrolyte layer 101, the second electrolyte layer 102, and the anode 202 may include a non-aqueous electrolyte solution, a gel electrolyte, and an ionic liquid for the purpose of facilitating the exchange of lithium ions and improving the output characteristic of the battery.

The non-aqueous electrolyte solution includes a non-aqueous solvent and a lithium salt which has been dissolved in the non-aqueous solvent. As the non-aqueous solvent, a cyclic carbonate solvent, a chain carbonate solvent, a cyclic ether solvent, a chain ether solvent, a cyclic ester solvent, a chain ester solvent, or a fluorine solvent may be used. Examples of the cyclic carbonate solvent include ethylene carbonate, propylene carbonate, and butylene carbonate. Examples of the chain carbonate solvent include dimethyl carbonate, ethyl methyl carbonate, and diethyl carbonate. Examples of the cyclic ether solvent include tetrahydrofuran, 1,4-dioxane, and 1,3-dioxolane. Examples of the chain ether solvent include 1,2-dimethoxyethane and 1,2-diethoxyethane. Examples of the cyclic ester solvent include γ-butyrolactone. Examples of the chain ester solvent include methyl acetate. Examples of the fluorine solvent include fluoroethylene carbonate, methyl fluoropropionate, fluorobenzene, fluoroethyl methyl carbonate, and fluorodimethylene carbonate. As the non-aqueous solvent, one non-aqueous solvent selected from these may be used alone. Alternatively, a combination of two or more kinds of non-aqueous solvents selected from these may be used as the non-aqueous solvent. The non-aqueous electrolyte solution may include at least one kind of fluorine solvent selected from the group consisting of fluoroethylene carbonate, methyl fluoropropionate, fluorobenzene, fluoroethyl methyl carbonate, and fluorodimethylene carbonate. As the lithium salt, $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, or $LiC(SO_2CF_3)_3$ may be used. As the lithium salt, one lithium salt selected from these may be used alone. Alternatively, a mixture of two or more kinds of lithium salts selected from these may be used as the lithium salt. The concentration of the lithium salt is, for example, within a range of 0.5 to 2 mol/liter.

As the gel electrolyte, a polymer material including the non-aqueous electrolyte solution may be used. As the polymer material, polyethylene oxide, polyacrylonitrile, polyvinylidene fluoride, polymethyl methacrylate, or a polymer having an ethylene oxide bond may be used.

The cation forming the ionic liquid may be:

an aliphatic chain quaternary salt such as tetraalkylammonium or tetraalkylphosphonium;

aliphatic cyclic ammonium such as pyrrolidinium, morpholinium, imidazolinium, tetrahydropyrimidinium, piperazinium, or piperidinium; or a nitrogen-containing heterocyclic aromatic cation such as pyridinium or imidazolium.

An anion forming the ionic liquid may be $PF_6^-$, $BF_4^-$, $SbF_6^-$, $AsF_6^-$, $SO_3CF_3^-$, $N(SO_2CF_3)_2^-$, $N(SO_2C_2F_5)_2^-$, $N(SO_2CF_3)(SO_2C_4F_9)^-$, or $C(SO_2CF_3)_3$. The ionic liquid may include a lithium salt.

At least one of the cathode 201, the first electrolyte layer 101, the second electrolyte layer 102, and the anode 202 may include a binder for the purpose of improving the adhesion between the particles. The binder is used to improve the binding property of the material forming the electrode. Examples of the binder include polyvinylidene fluoride, polytetrafluoroethylene, polyethylene, polypropylene, aramid resin, polyimide, polyimide, polyamideimide, polyacrylonitrile, polyacrylic acid, methyl polyacrylate ester, ethyl polyacrylate ester, hexyl polyacrylate ester, polymethacrylic acid, methyl polymethacrylate ester, ethyl polymethacrylate ester, hexyl polymethacrylate ester, polyvinyl acetate, polyvinylpyrrolidone, polyether, polyethersulfone, hexafluoropolypropylene, styrene butadiene rubber, and carboxymethylcellulose. As the binder, a copolymer of two or more kinds of materials selected from tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene may be used. In addition, two or more kinds of materials selected from these may be mixed and used as a binder.

In addition, at least one of the cathode 201 and the anode 202 may include a conductive assistant for the purpose of improving electron conductivity. Examples of the conductive assistant include graphite such as natural graphite or artificial graphite; carbon black such as acetylene black or ketjen black; a conductive fiber such as a carbon fiber or a metal fiber; carbon fluoride; metal powder such as aluminum; conductive whiskers such as zinc oxide or potassium titanate; a conductive metal oxide such as titanium oxide; or a conductive polymer compound such as polyaniline, polypyrrole, or polythiophene. Cost reduction can be achieved by using a carbon conductive assistant as the conductive assistant.

An example of the shape of the battery in the first embodiment may be a coin, a cylinder, a prism, a sheet, a button, a flat type, or a stacking structure.

<Manufacturing Method of First Solid Electrolyte Material and Second Solid Electrolyte Material>

The first solid electrolyte material and the second solid electrolyte material in the first embodiment may be manufactured by the following method, for example.

Binary halide raw material powders are prepared so as to provide a blending ratio of a target composition. For example, if $Li_3YCl_6$ is produced, LiCl and $YCl_3$ are prepared at a molar ratio of 3:1.

At this time, "M", "Me", and "X" in the above composition formula can be determined by selecting the kinds of the raw material powders. In addition, the values "α", "β", "γ", "d", "δ", "a", "x", and "y" can be adjusted by adjusting the raw materials, the blending ratio, and the synthesis process.

After the raw material powders are mixed well, the raw material powders are mixed and ground to react by a mechanochemical milling method. Alternatively, the raw material powders may be mixed well and then sintered in a vacuum.

Thereby, a solid electrolyte material including a crystal phase as described above is provided.

The configuration of the crystal phase (the crystal structure) in the solid electrolyte material can be determined by adjusting the reaction method and reaction conditions of the raw material powders.

EXAMPLES

Hereinafter, details of the present disclosure will be described with reference to inventive examples and comparative examples.

Inventive Example 1

[Production of First Solid Electrolyte Material]

In an argon glove box with a dew point of −60° C. or less, raw material powders LiCl and $YCl_3$ were prepared at a molar ratio of $LiCl:YCl_3$=2.7:1.1. Subsequently, milling processing was performed at 600 rpm for 25 hours using a planetary ball mill (manufactured by Fritsch, type P-5) to provide a powder of the first solid electrolyte material $Li_{2.7}Y_{1.1}Cl_6$.

[Production of Second Solid Electrolyte Material]

In an argon glove box having a dew point of −60° C. or less, raw material powders LiBr, LiCl, LiI, $YCl_3$, and $YBr_3$ were prepared at a molar ratio of $LiBr:LiCl:LiI:YCl_3:YBr_3$=1:1:4:1:1. Subsequently, milling processing was performed at 600 rpm for 25 hours using a planetary ball mill (manufactured by Fritsch, type P-7) to provide a powder of the second solid electrolyte material $Li_3YBr_2Cl_2I_2$.

[Production of Cathode Material]

In an argon glove box, $Li_{2.7}Y_{1.1}C_{16}$ and the cathode active material $Li(NiCoMn)O_2$ (hereinafter, referred to as NCM) were prepared at a weight ratio of 30:70. By mixing these in an agate mortar, the cathode material of the inventive example 1 was produced.

[Production of Secondary Battery]

The following steps were performed using the cathode material of the inventive example 1, the first solid electrolyte material $Li_{2.7}Y_{1.1}Cl_6$, which was used for the first electrolyte layer, and the second solid electrolyte material $Li_3YBr_2Cl_2I_2$, which was used for the second electrolyte layer.

First, in the insulating outer cylinder, 10 mg of the cathode material, 80 mg of the first solid electrolyte material $Li_{2.7}Y_{1.1}Cl_6$, and 80 mg of the second solid electrolyte material $Li_3YBr_2Cl_2I_2$ were stacked in this order. This was pressure-molded at a pressure of 360 MPa to provide a cathode and a solid electrolyte layer.

Next, 20 mg of aluminum powder was stacked on the cathode. This was pressure-molded at a pressure of 360 MPa to form a current collector.

Next, a metal In (thickness 200 μm), a metal Li (thickness 300 μm), and a metal In (thickness 200 μm) were stacked in this order on the surface of the solid electrolyte layer opposite to the other surface which was in contact with the cathode. This was pressure-molded at a pressure of 80 MPa to produce a stacking structure consisting of the cathode, the solid electrolyte layer, and an anode.

Next, stainless steel current collectors were placed on the upper and lower parts of the stacking structure, and current collector leads were attached to the current collectors.

Finally, an insulating ferrule was used to block and seal the inside of the insulating outer cylinder from the outside atmosphere to produce a battery.

In this way, the battery of the inventive example 1 was produced.

Inventive Example 2

[Production of First Solid Electrolyte Material]

In an argon glove box with a dew point of −60° C. or less, raw material powders LiBr and $YBr_3$ were prepared at a molar ratio of $LiBr:YBr_3$=3:1. Subsequently, milling processing was performed at 600 rpm for 25 hours using a planetary ball mill (manufactured by Fritsch, type P-5) to provide a powder of the first solid electrolyte material $Li_3YBr_6$.

[Production of Cathode Material]

In an argon glove box, $Li_3YBr_6$ and the cathode active material NCM were prepared at a weight ratio of 30:70. By mixing these in an agate mortar, the cathode material of the inventive example 2 was produced.

[Production of Secondary Battery]

The same steps as those of the inventive example 1 were performed to provide a battery of the inventive example 2, except that $Li_3YBr_6$ was used as the cathode material of the inventive example 2 and the first solid electrolyte material which was used for the first electrolyte layer.

Inventive Example 3

[Production of First Solid Electrolyte Material]

In an argon glove box having a dew point of −60° C. or less, raw material powders LiCl, $YCl_3$, and $ZrCl_4$ were prepared at a molar ratio of $LiCl:YCl_3:ZrCl_4$=2.5:0.5:0.5. Subsequently, milling processing was performed at 600 rpm for 25 hours using a planetary ball mill (manufactured by Fritsch, type P-5) to provide a powder of the first solid electrolyte material $Li_{2.5}Y_{0.5}Zr_{0.5}Cl_6$.

[Production of Cathode Material]

In an argon glove box, $Li_{2.5}Y_{0.5}Zr_{0.5}Cl_6$ and the cathode active material NCM were prepared at a weight ratio of 30:70. By mixing these in an agate mortar, the cathode material of the inventive example 3 was produced.

[Production of Secondary Battery]

The same steps as those of the inventive example 1 were performed to provide a battery of the inventive example 3, except that $Li_{2.5}Y_{0.5}Zr_{0.5}Cl_6$ was used as the cathode material of the inventive example 3 and the first solid electrolyte material which was used for the first electrolyte layer.

Inventive Example 4

[Production of Second Solid Electrolyte Material]

In an argon glove box with a dew point of −60° C. or less, raw material powders LiI and $YBr_3$ were prepared at a molar ratio of $LiI:YBr_3$=2.7:1.1. Subsequently, milling processing was performed at 600 rpm for 25 hours using a planetary ball mill (manufactured by Fritsch, P-5 type) to provide a powder of the second solid electrolyte material $Li_{2.7}Y_{1.1}Br_{3.3}I_{2.7}$.

[Production of Secondary Battery]

The same steps as those of the inventive example 1 were performed to provide a battery of the inventive example 4, except that $Li_{2.7}Y_{1.1}Br_{3.3}I_{2.7}$ was used as the second solid electrolyte material which was used for the second electrolyte layer.

Comparative Example 1

[Production of Secondary Battery]

The same steps as those of the inventive example 1 were performed to provide a battery of the comparative example 1, except that the first electrolyte layer was not used and that 160 mg of $Li_3YBr_2Cl_2I_2$ was used as the second solid electrolyte material which was used for the second electrolyte layer.

Comparative Example 2

[Production of Secondary Battery]

The same steps as those of the inventive example 2 were performed to provide a battery of the comparative example 2, except that the first electrolyte layer was not used and that 160 mg of $Li_3YBr_2Cl_2I_2$ was used as the second solid electrolyte material which was used for the second electrolyte layer.

Comparative Example 3

[Production of Secondary Battery]

The same steps as those of the inventive example 3 were performed to provide a battery of the comparative example 3, except that the first electrolyte layer was not used and that 160 mg of $Li_3YBr_2Cl_2I_2$ was used as the second solid electrolyte material which was used for the second electrolyte layer.

Comparative Example 4

[Production of Secondary Battery]

The same steps as those of the inventive example 4 were performed to provide a battery of the comparative example 4, except that the first electrolyte layer was not used and that 160 mg of $Li_{2.7}Y_{1.1}Br_{3.3}I_{2.7}$ was used as the second solid electrolyte material which was used for the second electrolyte layer.

[Charge/Discharge Test]

A charge/discharge test was performed under the following conditions using each of the batteries of the inventive examples 1 to 4 and the comparative examples 1 to 4.

The battery was placed in a thermostat chamber at 25° C.

The battery was charged with a constant current at a current value of 70 μA at a 0.05 C rate (20 hour rate) with respect to the theoretical capacity of the battery. The charging was terminated at a voltage of 3.7V.

Next, the battery was discharged at a current value of 70 μA, which was also 0.05 C rate. The discharging was terminated at a voltage of 1.9 V.

An In—Li alloy used for the anodes of the batteries of the inventive examples and the comparative examples exhibits an electric potential of 0.6 V vs. Li. In other words, the voltage 3.7 V at the termination of the charging and the voltage 1.9 V at the termination of the discharging in the inventive examples and the comparative examples are converted into Li reference potentials of 4.3 V vs. Li and 2.5 V vs. Li, respectively.

In this way, the initial charge/discharge efficiency (=initial discharge capacity/initial charge capacity) of each of the batteries of the inventive examples 1 to 4 and the comparative examples 1 to 4 was provided. The results are shown in the following Table 1.

second solid electrolyte material was not suppressed, and that, as a result, the charge/discharge efficiency of the battery was lowered significantly.

From the results of the comparative examples 1 and 4, it was confirmed that the charge/discharge efficiency of the second solid electrolyte material including I and used for the second electrolyte layer was also lowered significantly, even if the composition or structure of the second solid electrolyte material including I and used for the second electrolyte layer was different. In other words, if the second solid electrolyte material includes I, it was confirmed that there arises a problem of the oxidation and decomposition of the second solid electrolyte material and the decrease in the charge/discharge efficiency of the battery due to the oxidation and decomposition, regardless of the composition or structure of the second solid electrolyte material.

From the results of the inventive example 1 and the comparative example 1, it was confirmed that by using the first solid electrolyte material which does not include I for the first electrolyte layer, the oxidation and decomposition of the second solid electrolyte material including I of the second electrolyte layer can be suppressed, and that, as a result, the charge/discharge efficiency of the battery can be improved.

From the results of the inventive examples 1 to 3 and the comparative examples 1 to 3, it was confirmed that, even if the composition or structure of the first solid electrolyte material which does not include I used for the first electrolyte layer is different, the oxidation and decomposition of the second solid electrolyte material including I of the second electrolyte layer can be suppressed, and that, as a result, the charge/discharge efficiency of the battery can be improved.

From the results of the inventive examples 1 and 4 and the comparative examples 1 and 4, it was confirmed that, even if the composition or structure of the second solid electrolyte material including I and used for the second electrolyte layer is different, the charge/discharge efficiency of the battery can be improved by using the first solid electrolyte material which does not include I for the first electrolyte layer.

TABLE 1

|  | Solid electrolyte material included in the cathode | First solid electrolyte material | Second solid electrolyte material | Charge/Discharge efficiency [%] |
|---|---|---|---|---|
| Inventive Example 1 | $Li_{2.7}Y_{1.1}Cl_6$ | $Li_{2.7}Y_{1.1}Cl_6$ | $Li_3YBr_2Cl_2I_2$ | 83.2 |
| Inventive Example 2 | $Li_3YBr_6$ | $Li_3YBr_6$ | $Li_3YBr_2Cl_2I_2$ | 80.7 |
| Inventive Example 3 | $Li_{2.5}Y_{0.5}Zr_{0.5}Cl_6$ | $Li_{2.5}Y_{0.5}Zr_{0.5}Cl_6$ | $Li_3YBr_2Cl_2I_2$ | 82.0 |
| Inventive Example 4 | $Li_{2.7}Y_{1.1}Cl_6$ | $Li_{2.7}Y_{1.1}Cl_6$ | $Li_{2.7}Y_{1.1}Br_{3.3}I_{2.7}$ | 83.5 |
| Comparative Example 1 | $Li_{2.7}Y_{1.1}Cl_6$ | None | $Li_3YBr_2Cl_2I_2$ | 17.0 |
| Comparative Example 2 | $Li_3YBr_6$ | None | $Li_3YBr_2Cl_2I_2$ | 0 |
| Comparative Example 3 | $Li_{2.5}Y_{0.5}Zr_{0.5}Cl_6$ | None | $Li_3YBr_2Cl_2I_2$ | 7.9 |
| Comparative Example 4 | $Li_{2.7}Y_{1.1}Cl_6$ | None | $Li_{2.7}Y_{1.1}Br_{3.3}I_{2.7}$ | 8.0 |

Discussion

From the result of the comparative example 1 shown in Table 1, it was confirmed that, if the second solid electrolyte material including I was in direct contact with the cathode, the second solid electrolyte material is oxidized and decomposed, and that, as a result, the charge/discharge efficiency of the battery was lowered significantly.

From the results of the comparative examples 1 to 3, it was confirmed that, even if the solid electrolyte material used for the cathode material was changed, if the second solid electrolyte material including I was in direct contact with the cathode, the oxidation and the decomposition of the From the results of the inventive example 2, it was confirmed that, even when the battery in which the halide solid electrolyte which is disclosed in Non-patent Literature 1, includes Br, and has an electric potential stability of not more than 4.0 V vs. Li is in direct contact with the cathode is charged at an electric potential of 4.3 V vs. Li, the battery exhibits high charge/discharge efficiency.

INDUSTRIAL APPLICABILITY

The battery of the present disclosure can be used, for example, as an all-solid lithium secondary battery.

REFERENTIAL SIGNS LIST

1000 Battery
201 Cathode
100 Electrolyte layer
101 First electrolyte layer
102 Second electrolyte layer
202 Anode

The invention claimed is:

1. A battery, comprising:
a cathode;
an anode; and
an electrolyte layer disposed between the cathode and the anode,
wherein:
the electrolyte layer includes a first electrolyte layer and a second electrolyte layer,
the first electrolyte layer is disposed between the cathode and the second electrolyte layer,
the first electrolyte layer includes a first solid electrolyte material,
the second electrolyte layer includes a second solid electrolyte material which is a material different from the first solid electrolyte material,
the first solid electrolyte material is represented by a composition formula $Li_\alpha M_\beta X_\gamma$, where $2.5 \leq \alpha \leq 3$, $1 \leq \beta \leq 1.1$, $\gamma = 6$, M is at least one kind selected from the group consisting of Y, Mg, Ca, Sr, Ba, Zn, Sc, Al, Ga, Bi, Zr, Hf, Ti, Sn, Ta, and Nb, and X is at least one kind selected from the group consisting of Cl and Br, and the second solid electrolyte material is represented by a composition formula $Li_{\alpha'} M'_{\beta'} X'_{\gamma'}$, where $2.7 \leq \alpha' \leq 3$, $1 \leq \beta' \leq 1.1$, $\gamma' = 6$, M' includes at least one kind selected from the group consisting of Y, Mg, Ca, Sr, Ba, Zn, Sc, Al, Ga, Bi, Zr, Hf, Ti, Sn, Ta, and Nb, and X' includes I and at least one kind selected from the group consisting of Cl and Br.

2. The battery according to claim 1, wherein
M includes yttrium.

3. The battery according to claim 1, wherein
M' includes yttrium.

4. The battery according to claim 1, wherein
the cathode includes a cathode active material, and
the cathode active material is lithium nickel-cobalt-manganese oxide.

5. The battery according to claim 1, wherein
the cathode includes a mixture of a cathode active material and the first solid electrolyte material.

6. The battery according to claim 5, wherein
the cathode active material is lithium nickel-cobalt-manganese oxide.

* * * * *